United States Patent [19]

Sugimoto et al.

[11] Patent Number: 5,515,946
[45] Date of Patent: May 14, 1996

[54] BRAKE UNIT FOR A BICYCLE

[75] Inventors: Masanori Sugimoto; Tsuyoshi Sakashita, both of Osaka, Japan

[73] Assignee: Shimano, Inc., Osaka, Japan

[21] Appl. No.: 389,033

[22] Filed: Feb. 15, 1995

[30] Foreign Application Priority Data

Feb. 24, 1994 [JP] Japan ..................... 6-026453

[51] Int. Cl.⁶ ........................................ B62L 3/02
[52] U.S. Cl. ..................... 188/24.21; 188/24.12
[58] Field of Search ............... 188/73.44, 73.45, 188/24.11, 24.12, 24.19, 24.21, 24.22

[56] References Cited

U.S. PATENT DOCUMENTS

| 4,597,474 | 7/1986 | Nagano | 188/24.21 |
| 4,838,387 | 6/1989 | Yoshigai | 188/24.12 |
| 5,058,450 | 10/1991 | Yoshigai | 188/24.12 |
| 5,092,017 | 3/1992 | Hatauo et al. | 16/2 |

FOREIGN PATENT DOCUMENTS

| 0554909 | 8/1993 | European Pat. Off. . | |
| 2531674 | 2/1984 | France . | |
| 50-67558 | 6/1975 | Japan . | |
| 0134028 | 8/1982 | Japan | 188/73.45 |
| 0033520 | 2/1991 | Japan | 188/73.45 |

*Primary Examiner*—Robert J. Oberleitner
*Assistant Examiner*—Chris Schwartzs
*Attorney, Agent, or Firm*—James A. Deland

[57] ABSTRACT

A brake unit for a bicycle pivotably attached to brake brackets each having a support shaft (12a) projecting sideways and a radial seat surface formed in a proximal region of the support shaft. The brake unit comprises brake calipers (4) each including a boss (4a) having a boss bore for receiving the support shaft, a first end surface (4b) extending radially, and a second end surface (4c) disposed axially opposite from the first end surface. Each brake caliper is secured to the support shaft by a stud bolt (14) having a contact surface (15a) extending radially. A bush (13) is mounted between an inner peripheral surface of the boss bore and an outer peripheral surface of the support shaft. The first end surface of the brake caliper and the radial seat surface inhibit the brake caliper from moving in one axial direction. The contact surface of the stud bolt and the second end surface inhibit the brake caliper from moving in the other axial direction.

10 Claims, 4 Drawing Sheets

BRAKE UNIT FOR A BICYCLE

BACKGROUND OF THE INVENTION

1. Field of the Invention

The present invention relates to a brake unit for a bicycle pivotably attached to brake brackets each having a support shaft projecting sideways and a radial seat surface formed in a proximal region of the support shaft. This brake unit comprises:

brake calipers each including:

a boss having a boss bore for receiving the support shaft;

a first end surface extending radially; and a second end surface disposed axially opposite from the first end surface;

holding means for holding each brake caliper on the support shaft, the holding means having a contact surface extending radially; and a bush mounted between an inner peripheral surface of the boss bore and an outer peripheral surface of the support shaft;

2. Description of the Related Art

A conventional brake unit is disclosed in Japanese Utility Model Publication Kokai No. 1975-67558, for example. This brake unit includes brake calipers each defining a boss having a bush fitted therein, which bush is longer than the boss. The bush is inserted into a support shaft extending sideways from a brake bracket fixed to a bicycle frame. An end of the bush projecting from the boss is placed in contact with a seat surface extending radially of the brake bracket, and the bush is clamped with a stud bolt at the other end, whereby the brake caliper is pivotably attached to the support shaft. The brake caliper has a brake shoe mounted thereon. When a brake cable is pulled to swing the calipers toward a wheel, the brake shoes contact a wheel rim to apply a braking force to the bicycle.

In such a braking operation, the contact between the brake shoes and the rotating rim generates a force to move each brake caliper along the support shaft of the brake bracket. In order to prevent such displacement of the brake caliper, it is necessary for the conventional brake unit noted above to have the bush securely held between the stud bolt and the radially extending seat surface of the brake bracket. Further, the bush must be pressed hard into a bore of the bush of the brake caliper so that the bush is not slidable along the boss bore. However, the bush could be deformed when pressed hard into the boss bore, thereby impairing circularity of its inner peripheral wall. In this case, the bush press fit in the boss may be reamed though it tends to involve an additional cost. This eliminates the distortion of the inner periphery of the bush resulting from the press fitting into the boss, allows the brake caliper to be assembled to the brake bracket with ease, and realizes a smooth relative rotation between the brake caliper and support shaft.

The above inconvenience can occur not only with the brake unit disclosed in the prior publication cited hereinbefore, but with similar brake units disclosed in U.S. Pat. Nos. 4,754,853 and 5,058,450 and European Laying-Open Patent Publications Nos. 0432268A1 and 0554909.

SUMMARY OF THE INVENTION

The object of the present invention is to provide an improved brake unit of simple construction which inhibits each brake caliper from moving relative to a support shaft, and allows the brake caliper to be assembled to the support shaft with ease.

The above object is fulfilled, according to the present invention, by an improvement on the type of brake unit set forth under the Field of the Invention hereof, in which the first end surface and the radial seat surface inhibit each brake caliper from moving in one axial direction, and the contact surface of the holding means and the second end surface inhibit each brake caliper from moving in the other axial direction.

According to this construction, the first end surface of the brake caliper contacts the radial seat surface of the brake bracket directly or indirectly through a spacer, while the second end surface of the brake caliper contacts the contact surface of the holding means directly or indirectly through a spacer. This effectively inhibits the brake caliper from moving axially of the support shaft. The bush contributes toward a relative rotation between the brake caliper and support shaft, but need not contribute toward inhibiting the brake caliper from moving axially of the support shaft. It is thus unnecessary to press fit the bush tight in a boss bore of the brake caliper. This feature avoids the deformation of the bush due to hard pressing of the boss into the boss bore, and dispenses with a costly reaming operation.

In a preferred embodiment of the present invention, the end surfaces of the boss are used as the first and second end surfaces. This realizes a greatly simplified brake caliper construction. Further, the holding means may include a screw such as a stud bolt meshed with a threaded bore formed axially of the support shaft, and a spacer, the radial contact surface being formed on the spacer. Then, the brake caliper may be fixed in position simply by mounting the brake caliper on the support shaft and tightening the stud bolt.

A dimensional tolerance may be set to the boss bore and bush so that a relative sliding movement is allowed between the inner peripheral surface of the boss bore and an outer peripheral surface of the bush. This greatly facilitates insertion of the bush into the boss bore.

Furthermore, the bush may be formed of a curved sheet material. Then, not only is manufacturing cost lowered, but the bush may be inserted into the boss bore while being elastically deformed to diminish a diameter of the bush curved into cylindrical form. Once the bush is inserted into the boss bore, the bush is properly retained in the boss bore owing to the elastic restoring force of the bush.

The bush may be perforated with ease to hold a lubricant therein. This feature assures a smooth relative rotation between the support shaft and brake caliper over a long period of time.

Other features and advantages of the present invention will be apparent from the following description of embodiments taken with reference to the accompanying drawings.

DETAILED DESCRIPTION OF THE PREFERRED EMBODIMENTS

Figure 1:
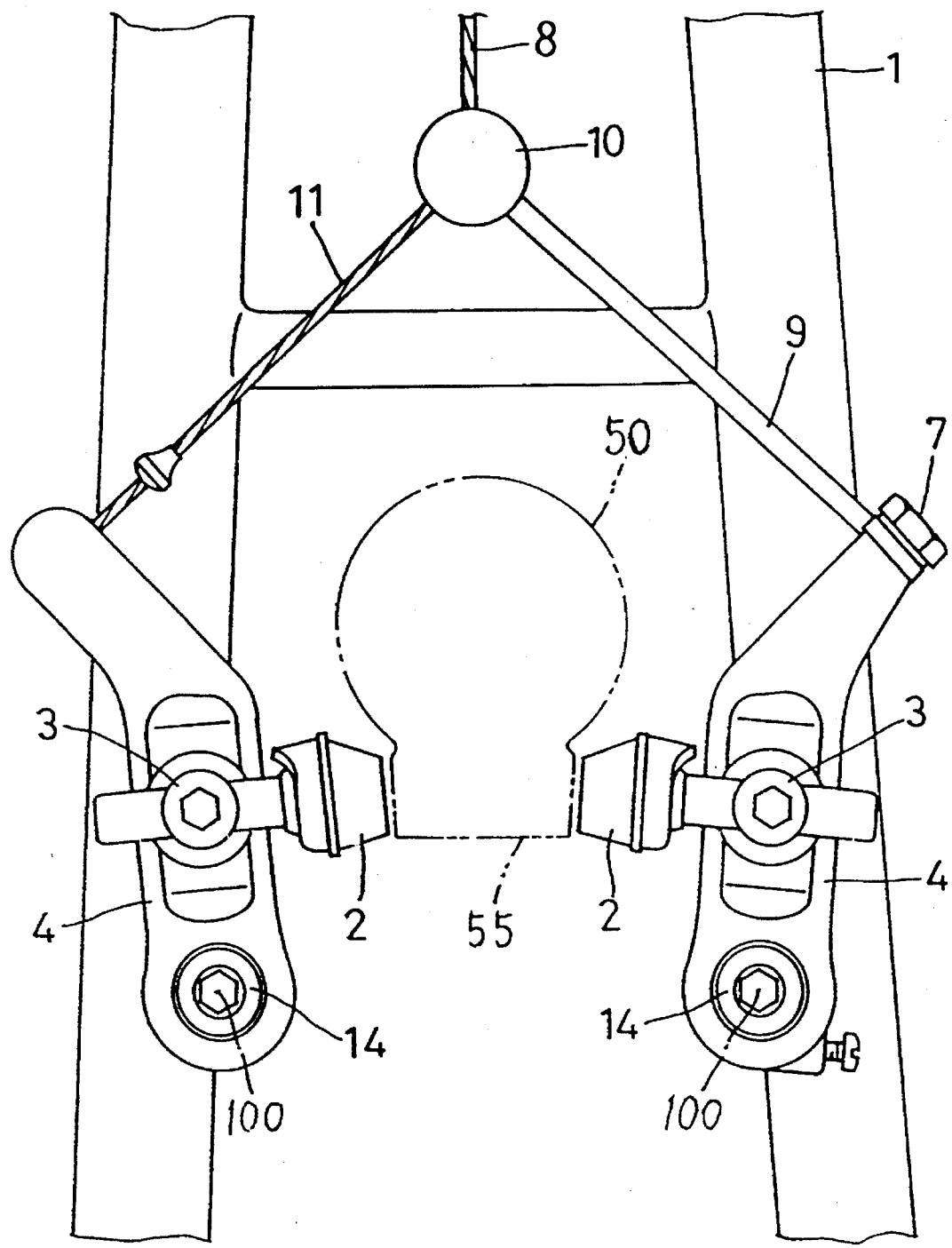
FIG. 1 is a front view of a cantilever type caliper brake of a bicycle employing, a brake unit according to the present invention.
Figure 2:
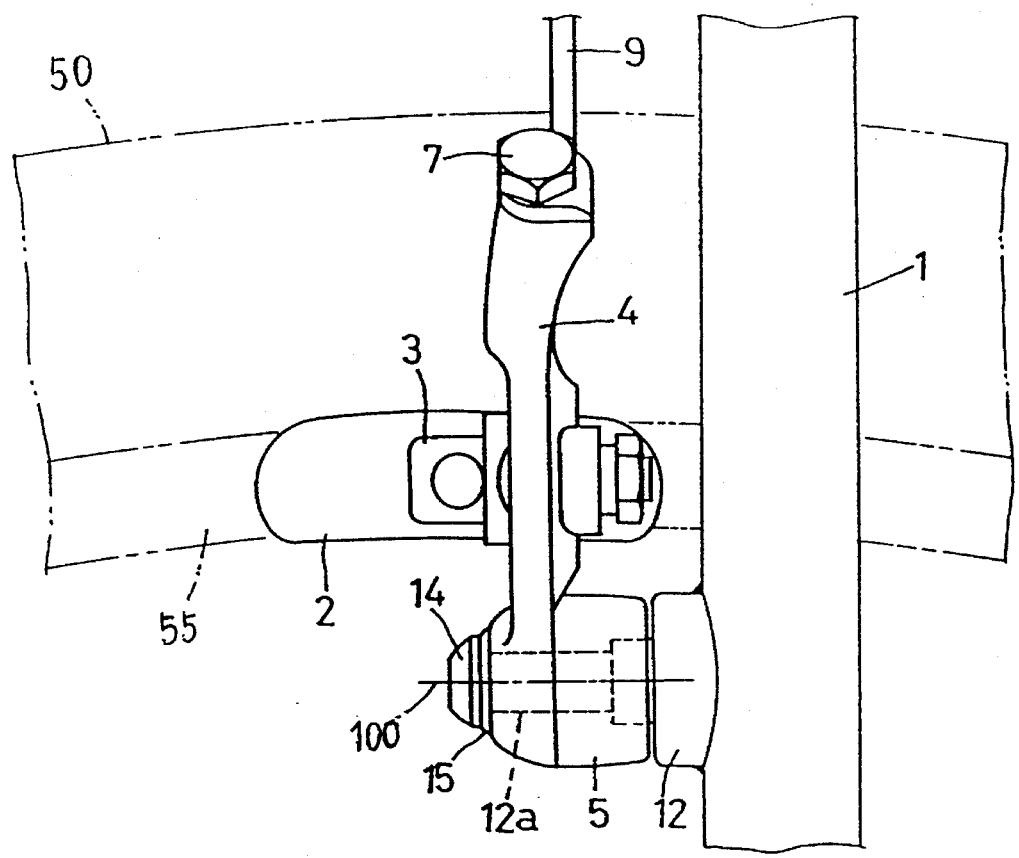
FIG. 2 is aside view of the brake unit attached to a bicycle frame.
Figure 3:
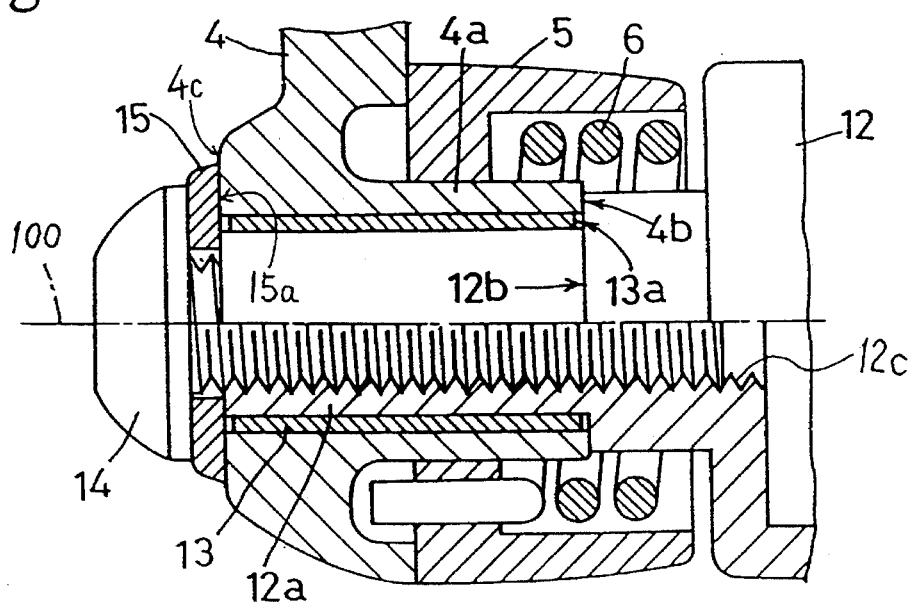
FIG. 3 is a sectional view showing a brake caliper attached to a support shaft of a brake bracket.

FIGS. 1 and 2 show a cantilever type caliper brake mounted on bicycle frames 1 adjacent a wheel 50. This brake includes a brake unit, and a pulling device for operating the brake unit. The brake unit has, as main components thereof, a pair of right and left brake calipers 4 attached to bicycle frames 1 to be pivotable about axes 100, respectively. Each brake caliper 4 has a brake shoe 2 attached to an intermediate position thereof by a clamp screw 3. As shown in FIG. 3, a return spring 6 acts on a proximal end of each brake caliper 4 through a spring case 5.

The pulling device includes a brake cable 8 connected at one end thereof to a cable anchoring screw 7 provided for a cable connection formed at a distal end of one of the calipers 4, and at the other end to a brake lever device (not shown). The pulling device further includes a connector 10 mounted on an intermediate position of the brake cable 8, a guide pipe 9 slidably mounted on the brake cable 8 between the connector 10 and the cable connection, and an interlock cable 11 extending between the connector 10 and the other brake caliper 4.

When the brake cable 8 is pulled, the end of the guide pipe 9 remote from the connector 10 contacts one of the brake calipers 4, whereby the guide pipe 9 acts as a strut. Consequently, the connector 10, where the brake cable 8 extending from the brake lever device turns in a different direction to extend to one of the brake calipers 4, is placed at the same distance to the cable connections of the two brake calipers 4. The brake cable 8, therefore, pulls the right and left brake calipers 4 evenly. Both of the brake calipers 4 pivot inwardly of the frames 1 to press the right and left brake shoes 2 upon a rim 55 of the wheel 50 to apply brakes thereto. When the brake cable 8 is relaxed, both of the right and left brake calipers 4 pivot outward under the force of return springs 6. As a result, the brakes shoes 2 retract from the rim 55 of the wheel 50 to cancel the brakes.

As shown in FIG. 2, each frame 1 has a brake bracket 12 welded thereto for attaching the right or left brake caliper 4 to the frame 1. The brake bracket 12 includes a support shaft 12a having axis 100 and extending horizontally. A shoulder having a larger diameter than the support shaft 12a is formed at a proximal end of the support shaft 12a. The shoulder defines a seat surface 12b extending radially.

The proximal end of each brake caliper 4 has a boss 4a defining a boss bore having axis 100. The boss 4a defines, at opposite ends thereof, a first end surface 4a and a second end surface 4c extending substantially at right angles to the axis 100.

Figure 4:
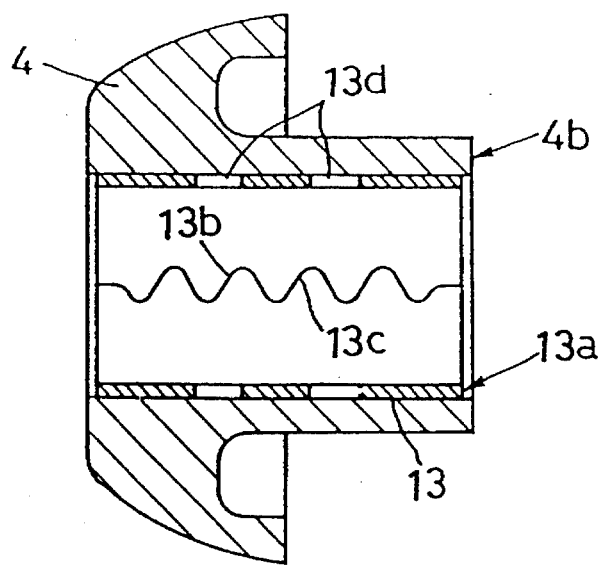
FIG. 4 is a sectional view of a boss of the brake caliper and a bush.
Figure 5:
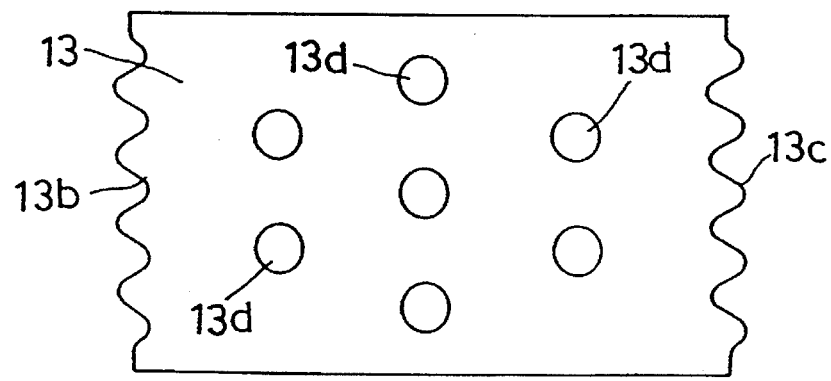
FIG. 5 is a development of the bush.

For attaching each brake caliper 4 to the brake bracket 12, a bush 13 is inserted into the boss bore of the boss 4a of the brake caliper 4. Then, the bush 13, together with the brake caliper 4, is fitted on the support shaft 12a and advanced until the first end surface 4a of the boss 4a contacts the radial seat surface 12b of the brake bracket 12. The support shaft 12a defines a threaded bore 12c extending axially from a free end thereof. A stud bolt 14 with a spacer 15 is screwed into the threaded bore 12c, whereby a radial contact surface 15a formed on the spacer 15 contacts the second end surface 4c of the boss 4a. The brake caliper 4 is inhibited from moving axially of the support shaft 12a by the contact between the first end surface 4a and radial seat surface 12b and the contact between the second end surface 4c and contact surface 15a. In this embodiment, the bush 13 extends substantially over an entire length of the boss bore. However, as seen from FIG. 4, the bush 13 stops slightly short of the first end surface 4a and second end surface 4c of the boss 4a, and is out of contact with the radial seat surface 12b and contact surface 15a. This bush 13 contributes toward a smooth relative rotation between the brake caliper 4 and support shaft 12a.

Figure 6:
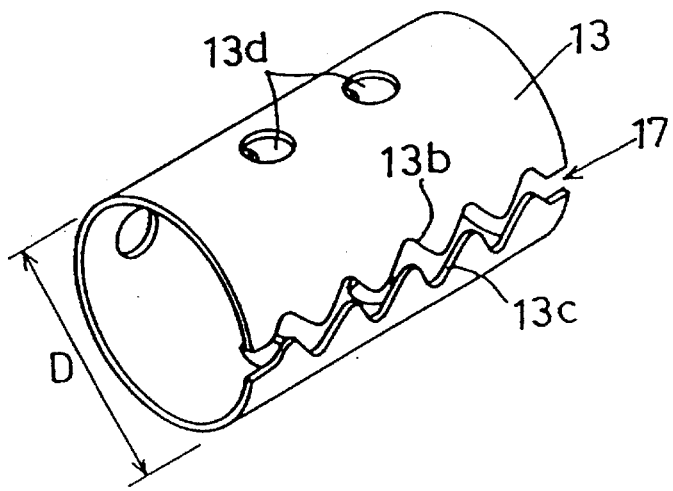
FIG. 6 is a perspective view of the bush in free state.

The bush 13 is formed of a sheet material having a pair of wave-shaped edges 13b and 13c and a plurality of perforations 13d. This sheet material is bent into a tubular shape as shown in FIG. 6. In free state, the wave-shaped edges 13b and 13c are opposed to each other with a gap 17 therebetween, so that the bush 13 has an outside diameter D slightly larger than a diameter of the boss bore of the brake caliper 4. The bush 13 is inserted into the boss bore while being elastically deformed to bring the wave-shaped edges 13b and 13c closer together and diminish the outside diameter from the free state. Once the bush 13 is inserted into the boss bore, the bush 13 presses against the inner peripheral surface of the boss 4a under its elastic restoring force to restore the outside diameter D in free state. Consequently, the bush 13 stays in place inside the boss bore. Thus, the bush 13 may be mounted in place with little frictional resistance occurring during its insertion, and after the insertion the boss bore and bush 13 contact each other reliably. Where desired, the bush may be shaped to have, in free state, substantially the same diameter as the boss bore, so that the bush may be inserted into the boss bore without elastic deformation.

The wave-shaped edges 13b and 13c help prevent relative axial movement of the bush edges which would cause the bush 13 to warp or jam. Axial movement of the bush edges would grind the edges. The wave-shaped edges 13b and 13c also allow point contacts between the edges in addition to linear contacts. The perforations 13d provide grease holding spaces between the support shaft 12a and the inner peripheral surface of the boss 4a. Thus, a large quantity of grease may be stored therein to assure a smooth operation of the brake caliper 4 over a long period of time.

Figure 7:
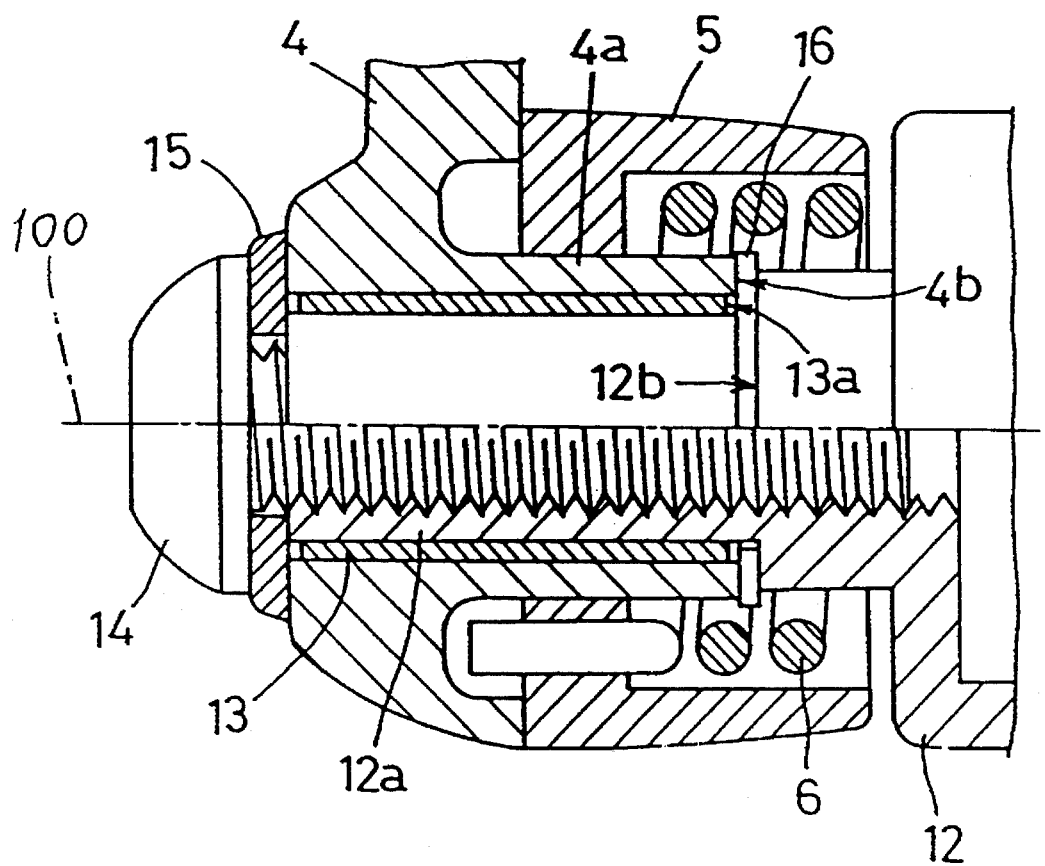
FIG. 7 is a sectional view of a brake unit having a spacer mounted between a radial seat surface of a brake bracket and a boss.

FIG. 7 shows a construction in a different embodiment for assembling each brake caliper 4 to the brake bracket 12.

This construction includes an annular spacer 16 mounted on the support shaft 12a of the brake bracket 12, between the first end surface 4a of the boss 4a of each brake caliper 4 and the radial seat surface 12b of the brake bracket 12. As the stud bolt 14 is tightened, the first end surface 4a contact the seat surface 12b through the spacer 16. An end surface 13a of the bush 13 opposed to the seat surface 12b is disposed inwardly of the boss 4a from the first end surface 4a. Thus, the bush 13 remains out of contact with the spacer 16 when the first end surface 4a contacts the seat surface 12b through the spacer 16. In this assembly structure, the radial seat surface 12b of the brake bracket 12 contacts the first end surface 4a through the spacer 16, and the brake caliper 4 is positioned with respect to the axial direction by the seat surface 12b of the brake bracket 12 without using the bush 13. However, as distinct from the preceding embodiment, the first end surface 4a indirectly, i.e. through the spacer 16, contacts the radial seat surface 12b of the brake bracket 12.

In the embodiments shown in FIGS. 3 and 7, the bush is formed of a curved sheet metal. This type of bush may be replaced with a cylindrical bush having no split. In the described embodiments, the end surface 13a of the bush opposed to the frame is disposed inwardly of the boss bore from the first end surface 4a. Alternatively, the end surface 13a of the bush may be disposed flush with the first end surface 4a.

What is claimed is:

1. A bicycle brake caliper shaped to be pivotably attached to a brake bracket having a support shaft projecting sideways and a radial seat surface formed in a proximal region of the support shaft, said brake caliper comprising:

a boss having a boss bore for receiving said support shaft;

a first end surface of said caliper extending radially, said first end surface and said radial seat surface inhibiting each brake caliper from moving in one axial direction when said brake caliper is mounted on said support shaft;

a second end surface of said caller disposed axially opposite from said first end surface;

holding means for holding said brake caliper on said support shaft, said holding means having a contact surface extending radially, said contact surface and said second end surface inhibiting said brake caliper from moving in another axial direction when said brake caliper is mounted on said support shaft; and a bush mounted radially inwardly of an inner peripheral surface of said boss bore for mounting radially outwardly of an outer peripheral surface of said support shaft, said bush being contained in said boss bore without projecting from said boss bore, and said bush having a gap extending between two longitudinal ends of said bush.

2. A brake caliper as defined in claim 1, wherein a relative sliding movement is allowed between said inner peripheral surface of said boss bore and an outer peripheral surface of said bush.

3. A brake caliper as defined in claim 2, wherein said bush is formed from a curved sheet material.

4. A brake caliper as defined in claim 3, wherein said bush has perforations formed therein for holding a lubricant.

5. A brake caliper as defined in claim 1, wherein said first and second end surfaces are end surfaces of said boss.

6. A brake caliper as defined in claim 5, wherein said holding means includes a screw for meshing with a threaded bore formed axially within said support shaft, and a spacer, said radial contact surface being formed on said spacer.

7. A brake caliper as defined in claim 1, wherein said gap of said bush is wave-shaped.

8. A brake caliper as defined in claim 1, wherein an axial length of said bush is shorter than an axial length between said first end surface and said second end surface.

9. A bicycle brake caliper shaped to be pivotably attached to a brake bracket having a support shaft projecting sideways and a radial seat surface formed in a proximal region of the support shaft, said brake caliper comprising:

a boss having a boss bore for receiving said support shaft;

a first end surface of said caliper extending radially, said first end surface and said radial seat surface inhibiting said brake caliper from moving in one axial direction when said brake caliper is mounted on said support shaft;

a second end surface of said caliper disposed axially opposite from said first end surface;

holding means for holding said brake caliper on said support shaft, said holding means having a contact surface extending radially, said contact surface and said second end surface inhibiting said brake caliper from moving in another axial direction when said brake caliper is mounted on said support shaft;

a bush mounted radially inwardly of an inner peripheral surface of said boss bore for mounting radially outwardly of an outer peripheral surface of said support shaft, said bush being contained in said boss bore without projecting from said boss bore, and said bush having a gap extending between two longitudinal ends of said bush; and a biasing spring for biasing said brake caliper, said spring being disposed radially outwardly of said boss and axially extending from a location between said first end surface and said second end surface to a location beyond said first end surface.

10. A bicycle brake caliper assembly comprising:

a brake bracket having a support shaft projecting sideways and a radial seat surface formed in a proximal region of the support shaft;

a brake caliper mounted to said support shaft, said brake caliper including:

a boss having a boss bore for receiving said support shaft;

a first end surface of said caliper extending radially, said first end surface and said radial seat surface inhibiting said brake caliper from moving in one axial direction;

a second end surface of said caliper disposed axially opposite from said first end surface;

holding means for holding said brake caliper on said support shaft, said holding means having a contact surface extending radially, said contact surface and said second end surface inhibiting said brake caliper from moving in another axial; and a bush mounted radially inwardly of an inner peripheral surface of said boss bore and radially outwardly of an outer peripheral surface of said support shaft, said bush being contained in said boss bore without projecting from said boss bore, and said bush having a gap extending between two longitudinal ends of said bush.

* * * * *

UNITED STATES PATENT AND TRADEMARK OFFICE
CERTIFICATE OF CORRECTION

PATENT NO. : 5,515,946
DATED : May 14, 1996
INVENTOR(S) : Masanori Sugimoto, et al.

It is certified that error appears in the above-indentified patent and that said Letters Patent is hereby corrected as shown below:

Claim 10, col. 6, line 46, after "axial" insert -- direction --.

Signed and Sealed this

First Day of October, 1996

Attest:

BRUCE LEHMAN

Attesting Officer

Commissioner of Patents and Trademarks